Oct. 9, 1962 D. B. PALL 3,057,481
CORRUGATED FILTER AND METHOD OF FORMING THE SAME
Filed June 12, 1958 2 Sheets-Sheet 1

INVENTOR
DAVID B. PALL
BY
Brumbaugh, Free, Graves & Donohue
HIS ATTORNEYS

Oct. 9, 1962  D. B. PALL  3,057,481
CORRUGATED FILTER AND METHOD OF FORMING THE SAME
Filed June 12, 1958  2 Sheets-Sheet 2

INVENTOR
DAVID B. PALL
BY
HIS ATTORNEYS

United States Patent Office 3,057,481
Patented Oct. 9, 1962

3,057,481
CORRUGATED FILTER AND METHOD OF FORMING THE SAME
David B. Pall, Roslyn Heights, N.Y., assignor to Pall Corporation, Glen Cove, N.Y., a corporation of New York
Filed June 12, 1958, Ser. No. 741,515
9 Claims. (Cl. 210—493)

This invention relates to screen filters and, more particularly, to a corrugated screen filter possessing superior strength and rigidity and a high filtering capacity.

Filter elements designed for high pressure fluid systems must, of necessity, possess sufficient inherent strength to withstand the high transverse forces resulting from the application of extreme fluid pressures. Moreover, as impurities accumulate within filter elements from continued use, these forces tend to increase, frequently causing deformation or fracture of the elements or requiring replacement to avoid breakage before the useful life of the filter has been completed.

Although screen filters having filaments of increased diameter provide greater resistance to these transverse forces, such filters inherently possess decreased total pore area with respect to the total filter area if the same maximum pore opening is maintained, thus increasing the transverse forces acting on the filter element. Also, even though filter elements including a fine screen supported by a coarser screen, are stronger than fine screen elements alone, they are still subject to deformation under high pressure and tend to become clogged rapidly as impurities accumulate.

In accordance with the present invention, therefore, a filter element having superior strength and rigidity and high impurity capacity is provided by combining a fine filter screen with a coarser support screen and pleating or corrugating the combination. The corrugated assembly is then passed through a sintering furnace to sinter-bond the wires of each screen, the adjacent screens of the sandwich, and the corrugation faces which are in contact with each other, thus forming an integral unit having high strength in all directions. In one embodiment of the invention, the filter screen is sandwiched between two support screens to provide maximum structural strength. Another embodiment of the invention utilizes a single support screen having its adjacent faces joined at each corrugation to provide decreased resistance to fluid flow, while in a third embodiment the adjacent faces of both the support screen and the filtering screen are sinter-bonded at each corrugation. Filter elements constructed in this manner have been found to present an effective filtering area to fluids from 3 to 50 times greater than the effective filtering area of the starting material.

If desired, in order to further increase the rigidity of a filter element arranged in the above manner, pressure may be applied to the corrugated assembly after sintering in a direction perpendicular to the corrugation faces to bring the screen surfaces more firmly into contact. After this compression, the unit is sintered again to increase the firmness of the bonds and hence the strength at right angles to the corrugations. Also, each of the screens may be sintered separately before the sandwich is assembled and, in addition, the sandwich may be sinter-bonded before corrugation as an aid in maintaining uniform pore size of the filtering screen during assembly.

According to the present invention, therefore, corrugated filters and methods of making the same are provided whereby each filter element has extremely high resistance to transverse forces. Further, filter elements constructed according to the invention have increased capacity for impurities and, even when clogged, will resist high transverse forces. Also, the maximum pore size of the filtering screen in each element may be controlled accurately, and considerably finer screens may be incorporated into an element of great strength and rigidity than was previously possible. In addition, elements arranged in the manner of the invention may be machined or blanked to a variety of shapes and sizes without affecting their filtering efficiency.

Typical filters and methods of making them according to the invention are described in detail below with reference to the accompanying drawings in which.

Figure 1:
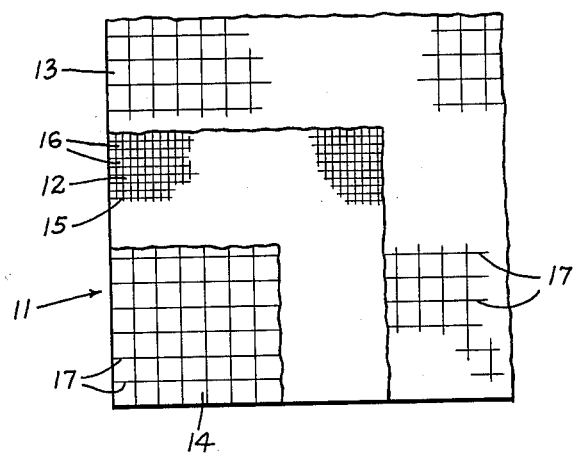
FIG. 1 is a fragmentary plan view, partially cut away, of a filter sandwich which may be utilized in forming a corrugated filter.

One type of filter is produced according to the invention from a filter sandwich 11 shown in FIG. 1, which comprises a filtering screen 12 of any desired fineness of mesh having two coarser support screens 13 and 14 placed on either side in contiguous relation to the screen 12. The metallic filaments 15 comprising the screen 12, which may be woven in any desired manner, for example, in a square weave, as illustrated, or in a twilled "Dutch" weave, are composed of any suitable material according to the intended use, for example, Monel or stainless steel.

Inasmuch as the maximum size of the pores 16 of the filtering screen 12 determines the magnitude of any impurities which can pass through a filter element constructed according to the invention, it is often desirable to control this pore size accurately. Preferably, this is done by rolling, pressing or coining the filtering screen with pressure applied perpendicularly to its faces to form contiguous flattened areas at the contact surfaces of adjacent filaments in the manner described in copending application Serial No. 562,127, filed January 30, 1956. As disclosed therein, filter screens of exceptionally small pore size, as low as 5 microns in diameter, with a high degree of uniformity and maximum structural rigidity may be prepared by sinter-bonding the wire mesh after flattening the contiguous portions of the filaments in this manner.

Similar wire filaments 17 are woven into any desired pattern to form the support screens 13 and 14, the diameter of these filaments being greater than that of the filaments 15 and preferably at least twice the diameter of the pores 16. It will be understood that, generally speaking, the rigidity of the corrugated filter element will increase as the diameter of the filaments 17 increases. As a practical matter, however, it is usually more difficult to corrugate filter sandwiches when the diameter of the filaments 17 is very large relative to the depth of the corrugations.

Figure 2:
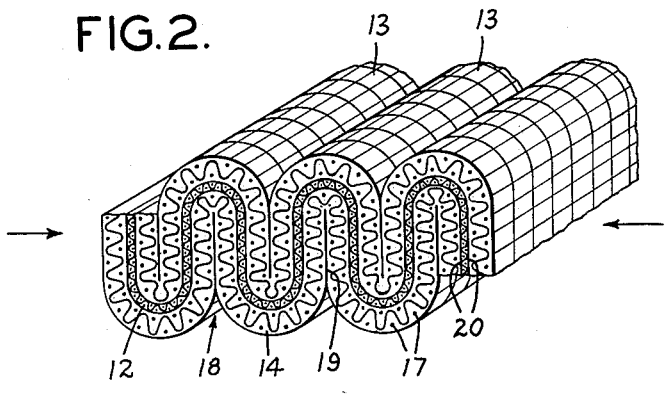
FIG. 2 is a perspective view showing a portion of a typical sandwich-type filter element after corrugation according to the invention.

In order to incorporate superior strength and rigidity into a filter element according to one form of the invention, a filter sandwich prepared in the above manner is pleated or folded, as shown in FIG. 2, to form a corrugated unit wherein the undulations of the filtering screen 12 are separated and securely supported in position from opposite sides by the folds 18 of the support screens 13 and 14, respectively. In forming the corrugations, the adjacent surfaces of at least one of the support screens at each fold 18 are pressed into contact to form a common interface 19, thereby assuring permanent bonding during the subsequent sintering operation. In general, it will be observed that corrugated filter elements having deep corrugations present a greater effective filter area and possess a greater capacity for impurities than those having shallower corrugations. Further, the strength of the filter element is improved in most cases by deepened corrugations, the increased width of the interfaces 19 providing greater structural rigidity after bonding.

Filter elements corrugated in the above manner are passed through a sintering furnace at a temperature sufficient to sinter-bond the adjacent filaments at the interfaces 19 along with those at the adjoining surfaces 20 of the filtering screen 12 and the support screens 13 and 14, thus forming an integral filter element having high strength in all directions.

After completion of the operations described above, a filter element may be provided with even greater rigidity by applying pressure in a direction perpendicular to the interfaces 19, as indicated by the arrows in FIG. 2, to compress the corrugations and bring more of the filaments 15 and 17 into mutual contact. A filter composed in this manner is then passed through the sintering furnace once more to bond the additional contact areas, thus increasing the resistance of the filter element to transverse forces.

Figure 3:
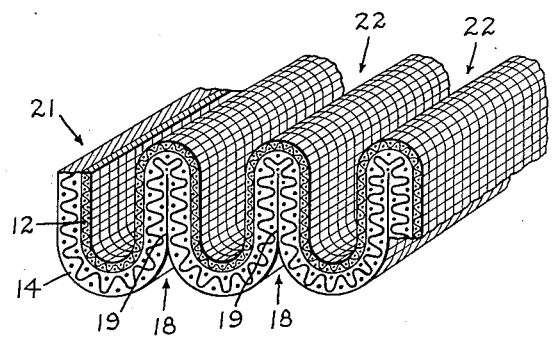
FIG. 3 illustrates another form of filter element arranged according to the invention.

In the embodiment of the invention illustrated in FIG. 3, a filter element 21 having decreased resistance to fluid flow while retaining superior rigidity is obtained by omitting one of the support screens. Thus, for example, the filter screen 12 and the support screen 14 are combined in contiguous relation and corrugated so that the adjacent faces of the support screen 12 are pressed into contact at each fold 18 to form a common interface 19. On the other side of the filter element, however, the adjacent faces of the support screen 12 at each fold are held apart during the formation of the element to form a channel 22 at each corrugation.

After formation, this structure is sintered in the manner described above to bond the support screen 14 at the interfaces 19, thereby providing a rigid filter element capable of withstanding high transverse forces and at the same time having relatively low resistance to fluid flow. Preferably, this type of filter element is mounted with the filter screen 12 on the upstream side.

Figure 4:
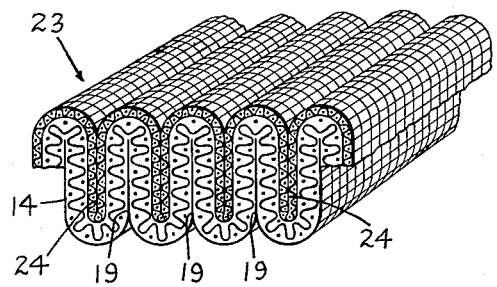
FIG. 4 shows still another filter constructed in accordance with the invention.

Another form of filter element can be made according to the invention by compressing the structure shown in FIG. 3 to place the adjacent faces of the filter screen 12 in contact at each corrugation. As illustrated in FIG. 4, a structure 23 formed in this manner has another interface 24 at each corrugation which, after sinter-bonding in the manner described above, provides further structural strength to the unit without the need of an additional support screen. Optimum filtering efficiency is obtained with filter elements formed in this manner when the element is positioned with the filtering screen 12 upstream.

Although the invention has been described with respect to specific embodiments, many variations and modifications thereof will occur to those skilled in the art. Accordingly, the scope of the invention is not intended to be restricted except as defined by the following claims.

I claim:

1. A method for forming a filter element having superior strength and rigidity and a high filtering capacity, comprising placing a filtering screen in face-to-face contact with at least one other screen of coarser mesh, corrugating the combined screens to place adjacent folded surfaces of at least one of the screens in contact with each other, and sinter bonding the said adjacent surfaces.

2. A method for forming a filter element having superior strength and rigidity and a high filtering capacity, comprising placing a filtering screen between two other screens of coarser mesh, corrugating the combined screens to place adjacent folded surfaces of at least one of the coarser screens in contact with each other, and sinter bonding the said adjacent surfaces of the corrugated screens.

3. A method for forming a filter element having superior strength and rigidity and a high filtering capacity, comprising placing a filtering screen between two other screens of coarser mesh in face-to-face contact therewith, corrugating the combined screens to place adjacent folded surfaces of the coarser screns in contact with each other, heating the corrugated screens to sinter-bond the adjacent surfaces thereof, compressing the corrugated screens by applying pressure in a direction perpendicular to the folded surfaces, and resintering to bond the said adjacent surfaces of the filter element.

4. A method for forming a filter element having superior strength and rigidity and a high filtering capacity, comprising placing a filtering screen in face-to-face contact with at least one other screen of coarser mesh, bonding the combined screens together, corrugating the combined screens to place adjacent folded surfaces of one of the screens in contact with each other, and heating the corrugated screens to sinter-bond the said adjacent surfaces thereof.

5. A corrugated filter having superior strength and rigidity and a high filtering capacity, comprising a filtering screen having an undulating shape, and at least one other screen of coarser mesh substantially contiguous with one surface of the filtering screen and having its adjacent folded surfaces sinter bonded together.

6. A corrugated filter having superior strength and rigidity and a high filtering capacity, comprising a filtering screen having an udulating shape, and at least one other screen of coarser mesh substantially contiguous with one surface of the filtering screen and sinter bonded thereto, at least one of the screens having its adjacent folded surfaces in mutual contact, and sinter-bonded together.

7. A corrugated filter having superior strength and rigidity and a high filtering capacity, comprising a filtering screen having an undulating shape, and another screen of coarser mesh on each side of the filtering screen and folded to be contiguous therewith, at least one of the coarser screens having its adjacent folded surfaces sinter bonded together.

8. A corrugated filter having superior strength and rigidity and a high filtering capacity, comprising a filtering screen formed in an undulating shape, and another screen of coarser mesh on each side of the filtering screen, folded to be contiguous therewith and sinter-bonded thereto and having filaments of at least twice the diameter of the pores of the filtering screen, each of the coarser screens having its adjacent folded surfaces sinter-bonded together.

9. A corrugated filter having superior strength and rigidity and a high filtering capacity, comprising a filtering screen formed in an undulating shape and another screen of coarser mesh substantially contiguous therewith, the adjacent surfaces of contiguous folds of each of the screens being sinter bonded together.

References Cited in the file of this patent

UNITED STATES PATENTS

| | | |
|---|---|---|
| 485,488 | Cockrell | Nov. 1, 1892 |
| 817,996 | Smith, Van | Apr. 17, 1906 |
| 2,008,560 | Nutting | July 16, 1935 |
| 2,082,126 | Schulz | June 1, 1937 |
| 2,082,513 | Roberts | June 1, 1937 |
| 2,122,053 | Burkhardt | June 28, 1938 |
| 2,164,142 | Moore | June 27, 1939 |
| 2,267,372 | Calkins | Dec. 23, 1941 |
| 2,395,449 | Briggs | Feb. 26, 1946 |
| 2,730,241 | Thomas | Jan. 10, 1956 |
| 2,925,650 | Pall | Feb. 23, 1960 |

OTHER REFERENCES

"Chemical Engineering," vol. 62, No. 12, 210–510, Dec. 1955, page 258A. (Copy in Patent Office Library.)

"Webster's New International Dictionary," second edition 1940, G. & C. Merriam Co., Springfield, Mass.

"Materials and Methods," vol. 41, April 1955, pages 98–101.